(12) United States Patent
Plain

(10) Patent No.: US 11,160,266 B2
(45) Date of Patent: Nov. 2, 2021

(54) FLYING INSECT CONTROL SYSTEM

(71) Applicant: John Plain, Park Ridge, NJ (US)

(72) Inventor: John Plain, Park Ridge, NJ (US)

(*) Notice: Subject to any disclaimer, the term of this patent is extended or adjusted under 35 U.S.C. 154(b) by 273 days.

(21) Appl. No.: 16/543,172

(22) Filed: Aug. 16, 2019

(65) Prior Publication Data

US 2020/0053998 A1 Feb. 20, 2020

Related U.S. Application Data

(60) Provisional application No. 62/719,939, filed on Aug. 20, 2018.

(51) Int. Cl.
| | | |
|---|---|---|
| *A01M 1/22* | (2006.01) | |
| *A01M 1/10* | (2006.01) | |
| *A01M 1/06* | (2006.01) | |
| *A01M 1/04* | (2006.01) | |
| *H02J 4/00* | (2006.01) | |

(52) U.S. Cl.
CPC ............. *A01M 1/223* (2013.01); *A01M 1/04* (2013.01); *A01M 1/06* (2013.01); *A01M 1/106* (2013.01); *H02J 4/00* (2013.01)

(58) Field of Classification Search
CPC .......... A01M 1/04; A01M 1/06; A01M 1/106; A01M 1/22; A01M 1/223
See application file for complete search history.

(56) References Cited

U.S. PATENT DOCUMENTS

| | | | |
|---|---|---|---|
| 2,030,310 A * | 2/1936 | McWilliams | A01M 1/24 43/112 |
| 3,041,773 A | 7/1962 | Gagliano | |
| 4,523,404 A | 6/1985 | DeYoreo | |
| 4,754,570 A | 7/1988 | Bakke | |
| 4,819,370 A * | 4/1989 | Woodruff | A01M 1/08 43/113 |
| 4,959,923 A | 10/1990 | Aiello et al. | |
| 5,020,270 A | 6/1991 | Lo | |
| 6,009,662 A * | 1/2000 | Chang | A01M 1/02 43/112 |
| 6,105,306 A | 8/2000 | Teng | |
| 6,718,690 B2 * | 4/2004 | Podgurney | A01M 5/04 43/138 |
| 9,661,838 B1 * | 5/2017 | Ho | A01M 3/025 |
| 2018/0274294 A1 * | 9/2018 | Hoffman | A01M 29/34 |

* cited by examiner

*Primary Examiner* — Richard G Davis

(74) *Attorney, Agent, or Firm* — Meagher Emanuel Laks Goldberg & Liao, LLP

(57) ABSTRACT

In accordance with various embodiments of the disclosed subject matter, an apparatus for killing insects generally comprising a backplate, having pivotally mounted thereto a first flange comprising an electrically conductive material and a second flange, the first and second flange being of similar shape; a flange operating mechanism, operably coupled to the first and second flanges, and configured for causing a position of the first and second flanges to move from an open position to a closed position; and a power switch, for selectively providing electrical energy to the electrically conductive material of the first flange such that an insect in contact therewith may be killed.

14 Claims, 4 Drawing Sheets

FLYING INSECT CONTROL SYSTEM

CROSS-REFERENCE TO RELATED APPLICATION

This application claims the benefit of provisional patent application Ser. No. 62/719,939 filed on Aug. 20, 2018, entitled FLYING INSECT CONTROL, which provisional patent application is incorporated herein by reference in its entirety.

FIELD OF THE DISCLOSURE

The present disclosure generally relates to devices for killing flying insects.

BACKGROUND

For as long as people have inhabited indoor spaces they have been plagued to one degree or another by flying insects invading their homes and buildings. A door left open, a screenless window or a small hole in a screen is all it takes for a flying pest to gain entry. These instances inevitably occur numerous times in almost all structures occupied by man. Whether it is the common house fly buzzing annoyingly around one's face, the larger and much faster blue bottle fly bouncing off of walls at what can seem like super sonic speed, a much larger still stinging insect such as a bee, wasp, or hornet, or a huge moth diving indiscriminately at the occupant or occupants of a room, these flying intruders cause varying levels of distress to all in their presence.

These flying insects can spread disease, contaminate food, and there are those who are quite fearful of large flying insects as well as those who are allergic to such insect stings and can suffer severe health consequences when stung. In short, human beings and large flying insects do not co-exist well in confined indoor spaces.

Up until now, the remedies to the problem have been both primitive and ineffective, or have had the potential to cause negative results when used.

The common fly swatter which has been used for ages relies on quickness that many people do not possess and requires that an insect land on a hard surface before it can be swatted. If the insect can finally be killed using this primitive and largely ineffective method, there is usually a dirty smudge, especially with very large insects left behind on a wall or a piece of furniture.

Using an insect spray from an aerosol can creates a health hazard because the mist from the insecticide settles quickly and can contaminate food preparation counters or food itself and can also be un-healthy to breathe in closed quarters and should therefore be relied upon sparingly, if at all.

SUMMARY OF THE INVENTION

Various deficiencies in the prior art are addressed below by a system and apparatus for killing flying insects, generally comprising a backplate, having pivotally mounted thereto a first flange comprising an electrically conductive material and a second flange, the first and second flange being of similar shape; a flange operating mechanism, operably coupled to the first and second flanges, and configured for causing a position of the first and second flanges to move from an open position to a closed position; and a power switch, for selectively providing electrical energy to the electrically conductive material of the first flange such that an insect in contact therewith may be killed.

In high voltage embodiments, the electrically conductive material may comprise any material (e.g., metal, plastic coated with a conductive material or overlay etc.), and a power converter may be used for converting direct current (DC) power signal provided by a battery into the high voltage alternating current (AC) power signal for use in bringing the electrically conductive material to a relatively high potential.

In low voltage embodiments, the electrically conductive material comprises a plurality of conductive strands disposed in parallel across a frame of the first flange, wherein each conductive strand is maintained at a voltage level different from an adjacent conductive strand; and the electrical energy to the electrically conductive material comprises a low voltage direct current (DC) signal applied to a first group of conductive strands, wherein each of the first group of conductive strands is separated from an adjacent conductive strand by a substantially zero potential conductive strand.

In various embodiments, the flange operating mechanism is further configured for causing a position of the first and second flanges to move from the open position to the closed position. The flange operating mechanism may comprise a pair of handles operably coupled to the flanges via a pivot point to enable thereby a scissoring operation of the flanges via the mechanical operating mechanism. Similar mechanical effect may be realized via telescopic tubes, via mechanisms such as used to open and close umbrellas and so on.

In various embodiments, an ultraviolet light source is disposed within a housing associated with the backplate and configured to provide ultraviolet light between the first and second flanges. A switch may be used for selectively providing electrical energy to the ultraviolet light source.

In various embodiments, the second flange comprises at least one fan configured to generate an airflow directed to urge an insect toward the first flange. A switch may be used for selectively providing electrical energy to the at least one fan.

In various embodiments, a power switch configured may be used to provide the DC power signal to the electrically conductive material directly or through the power converter such as in response to the flange operating mechanism causing the first and second flanges to move from an open position to a closed position. The power switch may be further configured to prevent the DC power signal being provided to the power converter or conductive strands in response to the flange operating mechanism causing the first and second flanges to move from the closed position.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a flying insect control system and apparatus that can rid indoor and outdoor spaces of winged pests far better than prior devices, and it can do so quickly, effectively and without leaving any toxic residue. The various embodiments find applicability in both indoor and outdoor applications.

Figure 1:
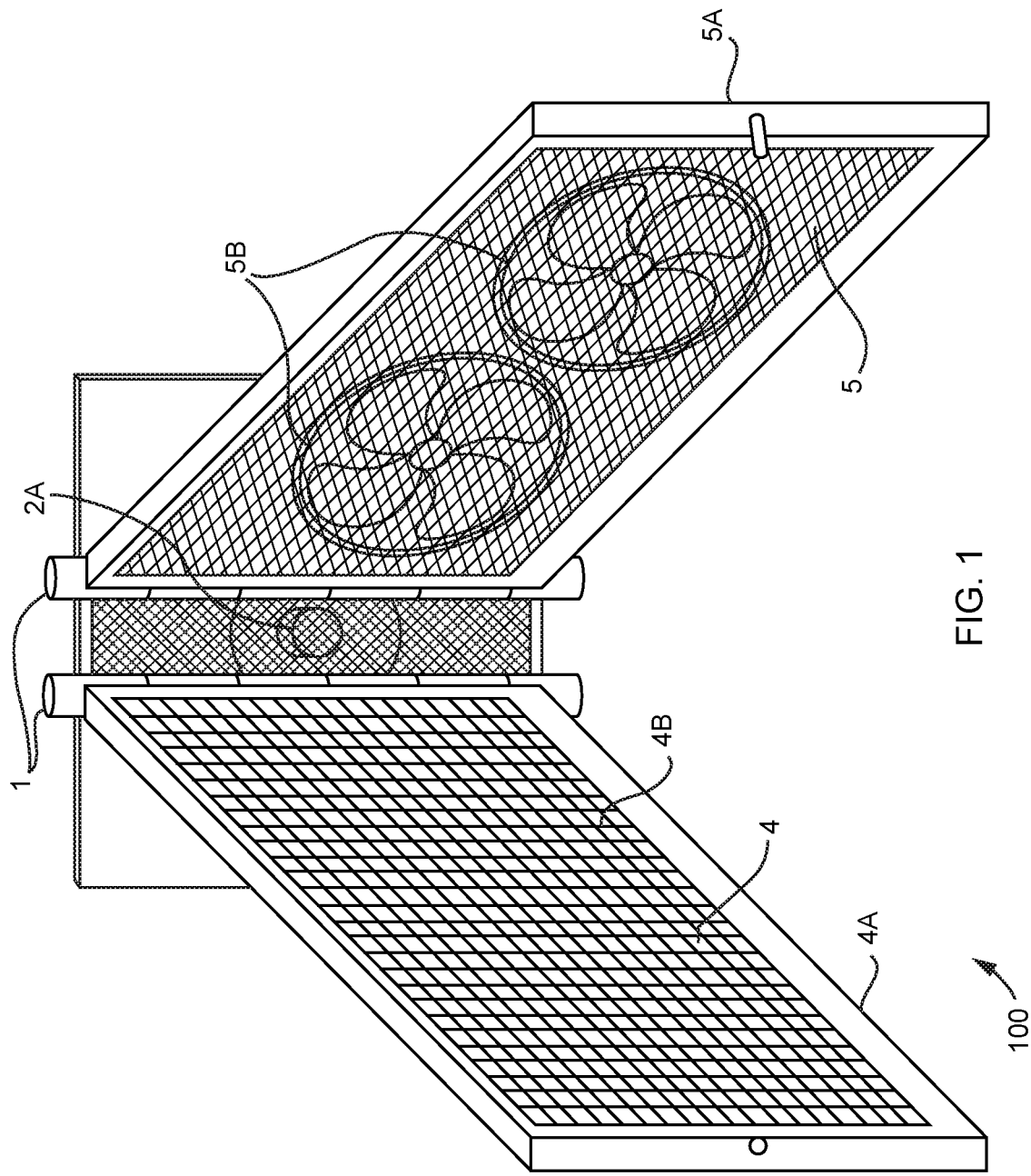
FIG. 1 depicts a front view of a handheld flying insect control apparatus according to an embodiment.
Figure 2:
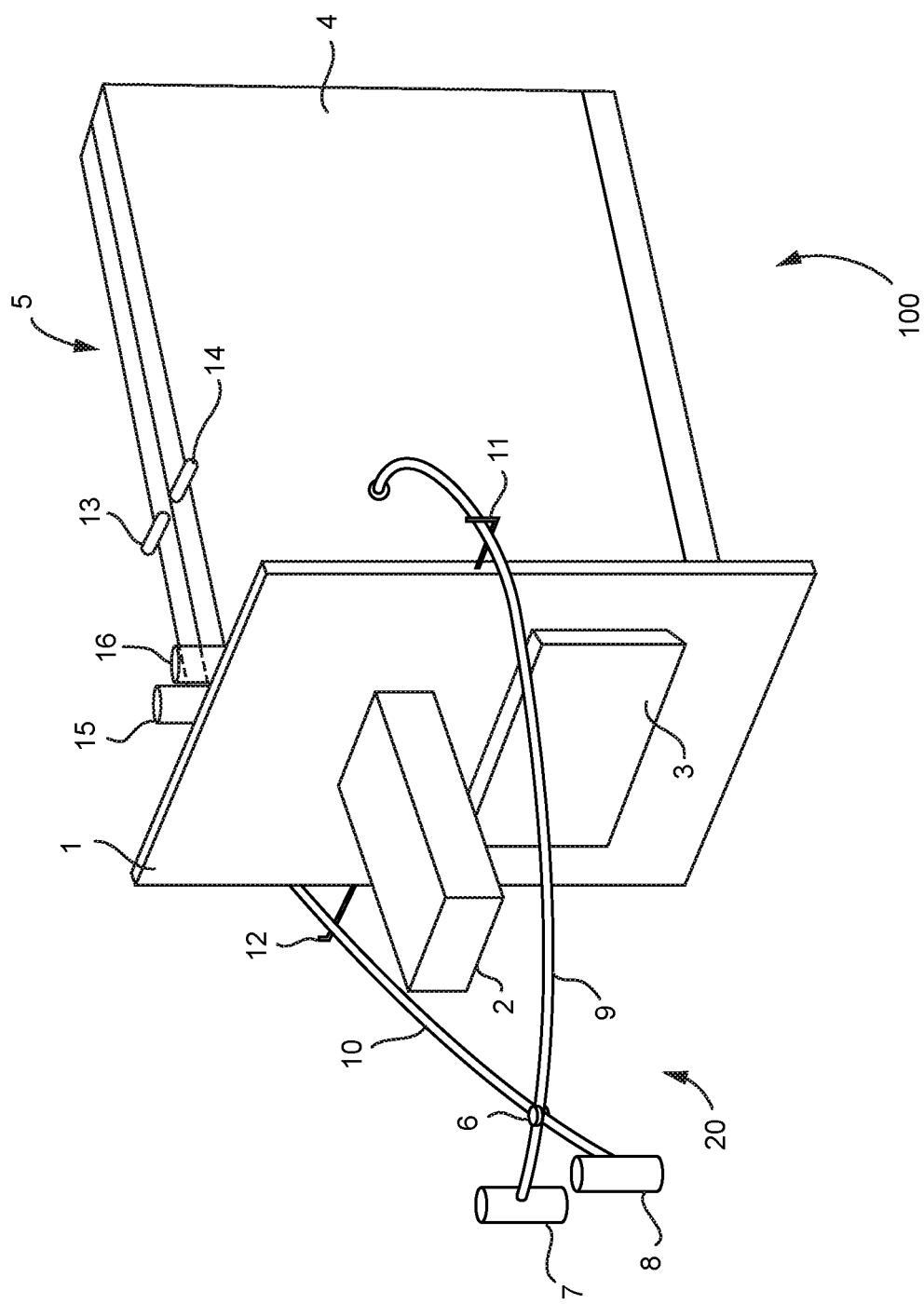
FIGS. 2-3 depict rear orthogonal views of the handheld flying insect control apparatus of FIG. 1 in closed and open positions, respectfully.
Figure 3:
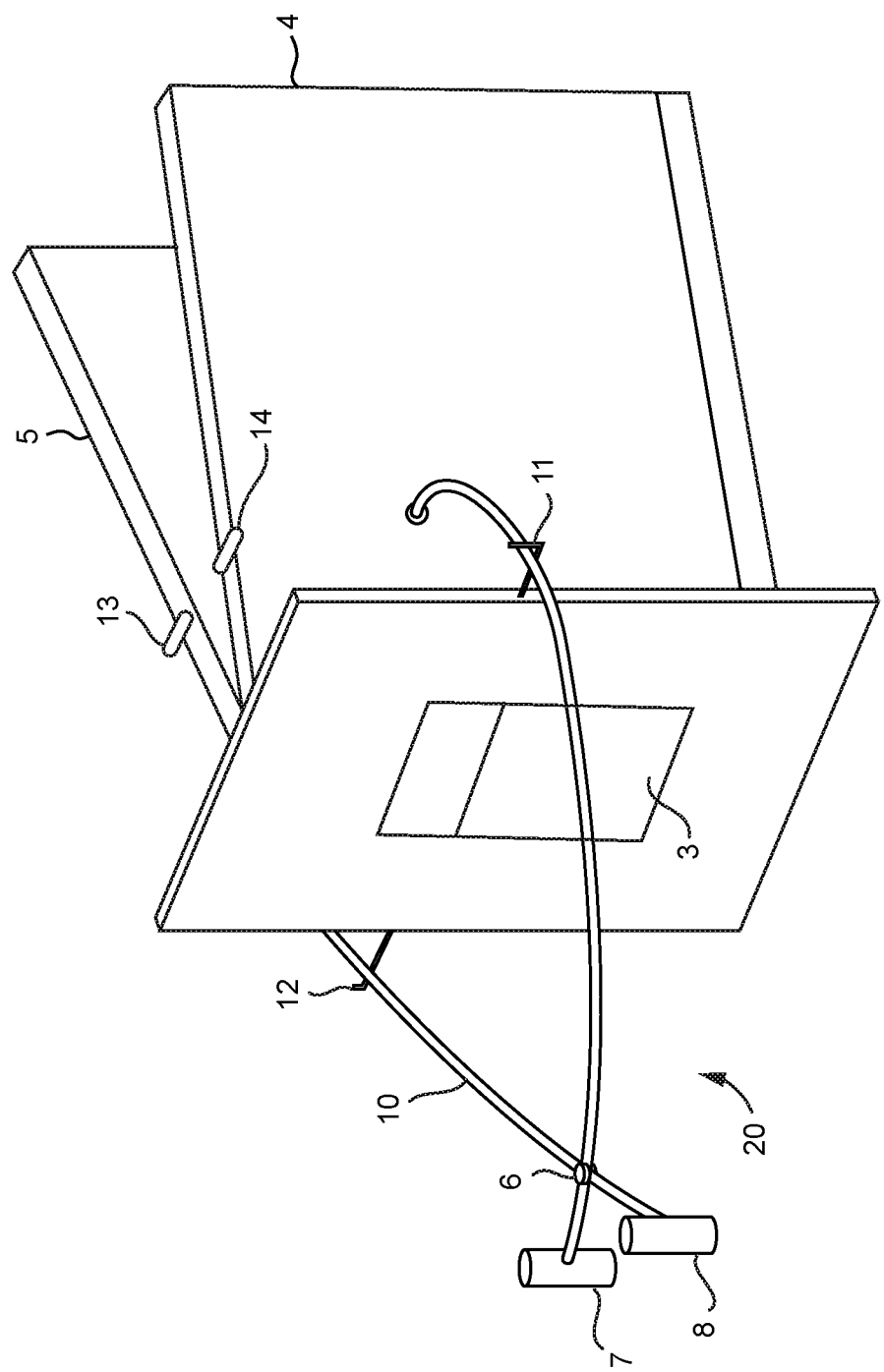

FIG. 1 depicts a front view of a handheld flying insect control apparatus according to an embodiment. FIGS. 2-3 depict rear orthogonal views of the handheld flying insect control apparatus of FIG. 1 in closed and open positions, respectfully.

Specifically, referring to FIGS. 1-3, the apparatus 100 comprises a back plate 1 having pivotally mounted thereto a first flange or arm 4 and a second flange or arm 5. The first flange 4 comprises a frame portion 4A supporting an electrically conductive grid or wire mesh portion 4B. The first flange 4 being configured to impart electrical energy sufficient to kill an insect contacting the conductive grid or mesh portion 4B. The second flange 5 comprises a frame portion 5A having a shape substantially similar to that of the frame portion 4A of the first flange 4 and supporting a grid or mesh portion 5B. The second flange 5 being configured to prevent an insect from passing therethrough and, when pivoted toward the first flange 4, to urge any insect therebetween into contact with the conductive grid or mesh portion 4B of the first flange 4 to thereby kill the insect(s).

Optionally, the grid or mesh portion 5B includes one or more fans which are configured to produce an airflow further urging any insect therebetween into contact with the conductive grid or mesh portion 4B of the first flange 4. The flanges 4 and 5 may be formed of a relatively light material such as plastic, metal or wood, and may have a round, square, elongated or other shape which facilitates implementing the functionality described herein; namely, opening to allow an insect to fly there between and closing to trap/electrocute the insect. Thus, in various embodiments, on the inside of one flange 5 there is a fan or fans covered by a screen, while on the inside of the other flange 4 there is a conductive grid 4B comprising many current carrying wires running in the vertical direction, horizontal direction or some combination thereof.

The flanges 4, 5 may be joined or pivotally connected at respective proximate ends via respective hinges to the backplate 1, which hinges allow the flanges 4, 5 to pivot into either of an open position (FIG. 3) or a closed position (FIG. 2).

A flange operating mechanism 20 is configured for at least causing a position of the first and second flanges to move from the open position to the closed position. In various embodiments, the flange operating mechanism 20 is also configured for causing a position of the first and second flanges to move from the open position to the closed position. Various flange operating mechanisms 20 are contemplated by the inventor, including mechanical, electrical and/or electromechanical operating mechanisms.

As shown in the figures, the flange operating mechanism 20 comprises a mechanical flange operating mechanism in which a pair of handles are operably coupled to the flanges via a pivot point to enable thereby a scissoring operation of the flanges via use manipulation of the handles of the flange operating mechanism. Specifically, in various embodiments, the opening and closing of the flanges 4, 5 is accomplished by means of two pivot rods 9, 10 attached to a central pivot pin 6 which may be manually operated in a scissors like manner to thereby open the flanges (i.e., create space between flanges 4, 5) or close the flanges (i.e., bring flanges 4, 5 together). As depicted in the figures, at the end of each pivot rod 9, 10 is a respective handle 7, 8 which, when moved out or in by the user, will either open or close the flanges 4, 5 in a manner similar to the way in which scissor blades are opened and closed. Other mechanisms for opening and closing the flanges may be used.

Referring to FIG. 2, when the flanges 4, 5 are closed together, they generally interlock and/or cooperate with one another and may be held in place by a lightly tensioned open spring loaded latch located at the front of both flanges. When in the closed position, the fan or fans and the conductive grid 4B may be in contact or may be separated by a relatively small distance such that any motion of the insect will likely result in the insect contacting the conductive grid 4B.

The apparatus optionally includes a central compartment 2 having disposed therein an ultraviolet light 2A which, when illuminated, operates to lure an insect into a space between the pair of flanges 4, 5. That is, in various embodiments an ultra violet/black light bulb is slightly recessed within the backplate 1, and this bulb is covered by a small screen. In various embodiments, the bulb received power from a battery which is selectively delivered to the bulb via a switch located on, for example, one of the handles 7, 8 or elsewhere on the apparatus 100. In various embodiments an ultraviolet light is not used, since users of the apparatus may be skillful enough to manually ensnare an insect without the need to lure the insect into the space between the flanges 4, 5.

Figure 4:
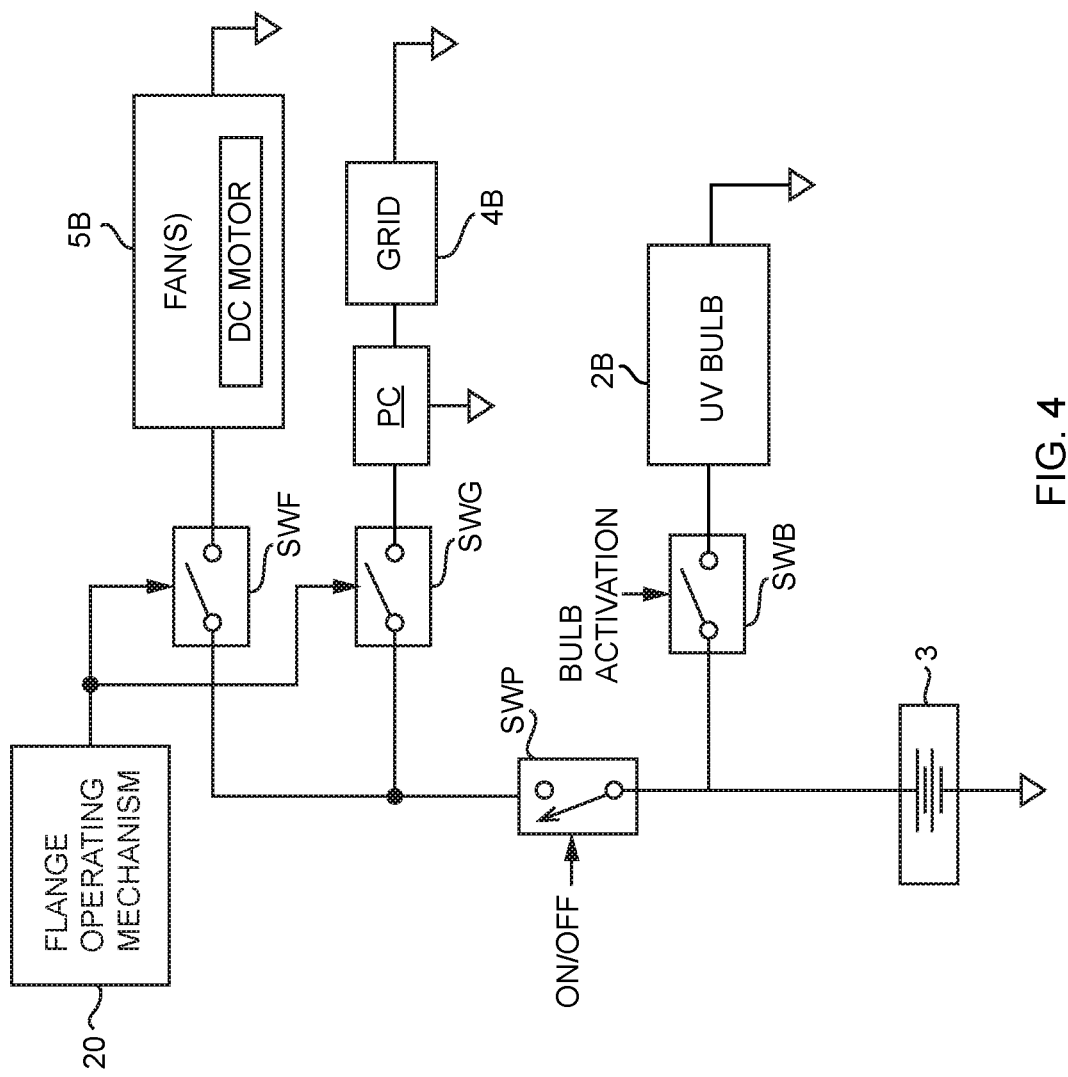
FIG. 4 depicts a simplified circuit diagram of the apparatus of FIG. 1.

FIG. 4 depicts a simplified circuit diagram of the apparatus of FIG. 1. A power source 3 such as a battery provides power to a UV bulb 2B via a switch SWB, which switch may be mounted in/on a user accessible portion of the apparatus 100 such that user control of energizing the UV bulb 2B is provided.

The power source 3 is also depicted as providing power to, illustratively, one or more DC motors associated with one or more optional fans 5B via a switch SWF, which switch may be mounted in/on a user accessible portion of the apparatus 100 such that user control of energizing the fan(s) 5B is provided.

In a high voltage embodiment, the power source 3 provides power to, illustratively, a power converter PC and conductive grid 4B via a switch SWG, which switch may be mounted in/on a user accessible portion of the apparatus 100 such that user control of energizing the conductive grid 4B is provided. The power converter PC is configured to convert power from the power source 3 into a form suitable for use by the conductive grid 4B, such as converting/chopping a 3 VDC or 12 VDC power signal into a high voltage AC/chopped signal suitable for use in killing insects. Any circuitry suitable for this purpose may be used, including power inverters, DC signal chopping circuitry feeding a step up transformer and so on as is known. In such a high voltage embodiment, the conductive grid may comprise a flat material, mesh material, wire grid and the like wherein the conductive material is brought to a relatively high voltage (hundreds or thousands of volts) such that an insect touching the conductive grid is killed by a high voltage discharge to/through the insect as is known.

In a low voltage embodiment, the power converter PC is not used and the conducive grid comprises a series of conductive wires disposed in parallel with each other such that an insect touching two adjoining wires completes a circuit therebetween and is killed. In this embodiment, the conductive grid 4B may comprise a plurality of zero potential (ground) conductive strands/wires alternating with a plurality of DC voltage level potential conductive strands/wires disposed, strung, glued or otherwise placed within the frame portion 4A of the flange 4. Each of the zero potential and DC voltage potential strands may be formed of a respective single strand that is routed in and out of respective openings of the frame portion 4A in a manner similar to that of stringing a tennis racquet, but with two parallel strings slightly offset from each other. In various embodiments, the resistance of the wires is selected such that the amount of current delivered to anything connecting the two strands (e.g., insect, human finger and so on) is limited to a human-safe current level such as 5 mA or less.

As depicted in FIG. 4, an on/off switch SWP is provided to supply/deny power to both the fan(s) 5B and conductive grid 4B, which switch may be mounted in/on a user accessible portion of the apparatus 100 such that user control of energizing the conductive grid 4B and, optionally, fan(s) 5B is provided.

As depicted in FIG. 4, the switches SF and SWG are simultaneously controlled by operation of the flange operating mechanism 20 in that power, if available via the on/off switch SWP, is provided to the conductive grid 4B and optional fan(s) 5B only when the flanges 4, 5 are in the "closed" position (e.g., such as when an insect is trapped therebetween to be killed).

In operation, when there is a flying insect that a user of the device wishes to kill, he or she grasps the handles 7, 8 to open the flanges 4, 5 in a scissors-like fashion while (optionally) pushing a button on one of the handles to turn on the ultra violet light and attract the insect, causing it to fly into the space between the separated flanges whereupon the user may then push the handles together to close the flanges 4,5 and trap the insect there between.

In various embodiments, the insect is automatically electrocuted in that closing the flanges 4, 5 results in the conductive grid 4B being energized and, optionally, the fan(s) 5B being energized. In other embodiments, the insect is electrocuted when the user presses a button or otherwise manually caused the energization of the conductive grid 4B and/or fans 5B associated with the flanges 4, 5 such that the fan or fans urges (blows) the insect onto the grid where it is electrocuted. In embodiments without a fan, the insect may be trapped between the flanges and the apparatus may then be shaken to cause a trapped insect to come into contact with the energized conductive grid 4B.

In various embodiments, the fan (or fans) 5B is powered by a DC motor contained in a housing on the side of one of the flanges, and this motor, along with the ultra violet bulb, the conductive grid, the fans etc. are energized by a DC source such as a lithium ion battery pack (or standard batteries etc.) and power conversion circuitry 3 affixed to the rear of the back plate or other suitable location.

The battery pack may contain several lithium-ion batteries. For example, three or four lithium-ion batteries may be connected in series where each provides 3.7 V such that the total output voltage will comprise approximately 11 V to 15 V.

The power conversion circuitry is used to convert power from the battery pack into one or power signals suitable for use by the one or more fans associated with the first flange 5, the conductive grid associated with the second flange 4, and the ultraviolet bulb used to attract insects between the two flanges 4, 5. The power conversion circuitry operates in a standard manner in various embodiments to provide each of the various signals.

As an example, if the one or more fans comprise 12 V DC fans, since these fans typically tolerate significant variations in the applied voltage such that the 11 V to 15 V output of three or four series-connected lithium-ion batteries may be directly supplied to the fans. For fans of differing voltage requirements, the power conversion circuitry may be modified to support the differing voltage requirements (e.g., higher or lower DC voltage, AC voltage and the like). Similarly, a DC or AC ultraviolet light bulb may be driven by an appropriately conditioned signal provided by the power conversion circuitry. In various embodiments, the ultraviolet light and fans are selected as those utilizing the same type of DC or AC electrical power signals.

In various embodiments, the conductive grid 4B of the flange 4 is driven by a high voltage/low current signal (either AC or DC). Further, the current of the driving signal is limited to less than 5 mA for safety purposes. This may be implemented using one of a variety of techniques. In one technique, the wire size, wire length and general physical dimensions associated with the construction of the conductive grid are selected such that a 5 mA current limit is inherently provided by the supply voltage and resistance of the wires forming the notification grid. In other techniques, a standardized conductive grid is provided wherein the initial power (e.g., output of the battery pack) is converted from a direct current signal into an alternating or chopped signal, after which the signal is amplified such as via a step-up transformer to provide thereby a high-voltage/low current electrification signal for the conductive grid. Again, various embodiments contemplate current limits selected to avoid harm to a human operator or pet should they come in contact with the conductive grid. Such current limits are contemplated to be 5 mA; however, larger or smaller current limits may also be employed within the context of the various embodiments.

In various embodiments, a safety feature is provided wherein neither the fans nor the conductive grid can be switched on while the flanges are in the open position since the circuit that powers them must be completed by two pins, one on the edge of each flange, that fit together to carry current only when the flanges are in the closed position.

Various deficiencies in the prior art are addressed below by a system and apparatus for killing flying insects, generally comprising a backplate, having pivotally mounted thereto a first flange comprising an electrically conductive material and a second flange, the first and second flange being of similar shape; a flange operating mechanism, operably coupled to the first and second flanges, and configured for causing a position of the first and second flanges to move from an open position to a closed position; and a power switch, for selectively providing electrical energy to the electrically conductive material of the first flange such that an insect in contact therewith may be killed.

In high voltage embodiments, the electrically conductive material may comprise any material (e.g., metal, plastic coated with a conductive material or overlay etc.), and a power converter may be used for converting direct current (DC) power signal provided by a battery into the high voltage alternating current (AC) power signal for use in bringing the electrically conductive material to a relatively high potential.

In low voltage embodiments, the electrically conductive material comprises a plurality of conductive strands disposed in parallel across a frame of the first flange, wherein each conductive strand is maintained at a voltage level different from an adjacent conductive strand; and the electrical energy to the electrically conductive material comprises a low voltage direct current (DC) signal applied to a first group of conductive strands, wherein each of the first group of conductive strands is separated from an adjacent conductive strand by a substantially zero potential conductive strand.

In various embodiments, the flange operating mechanism is further configured for causing a position of the first and second flanges to move from the open position to the closed position. The flange operating mechanism may comprise a pair of handles operably coupled to the flanges via a pivot point to enable thereby a scissoring operation of the flanges via the mechanical operating mechanism. Similar mechanical effect may be realized via telescopic tubes, via mechanisms such as used to open and close umbrellas and so on.

In various embodiments, an ultraviolet light source is disposed within a housing associated with the backplate and configured to provide ultraviolet light between the first and second flanges. A switch may be used for selectively providing electrical energy to the ultraviolet light source.

In various embodiments, the second flange comprises at least one fan configured to generate an airflow directed to urge an insect toward the first flange. A switch may be used for selectively providing electrical energy to the at least one fan.

In various embodiments, a power switch configured may be used to provide the DC power signal to the electrically conductive material directly or through the power converter such as in response to the flange operating mechanism causing the first and second flanges to move from an open position to a closed position. The power switch may be further configured to prevent the DC power signal being provided to the power converter or conductive strands in response to the flange operating mechanism causing the first and second flanges to move from the closed position.

The various embodiments provide users with an easy, efficient and non-toxic way of killing all large and/or stinging insects that invade their picnics, barbecues or other outdoor events where food is being prepared and eaten. Since large flying and stinging insects exist wherever one goes on earth, my invention has great practical and utilitarian value, both on an indoor and outdoor basis to people throughout the world, and is thus of great benefit to all mankind.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. Apparatus for killing a flying insect, comprising:
 a backplate, having pivotally mounted thereto a first flange comprising an electrically conductive material and a second flange, the first and second flange being of similar shape;
 a flange operating mechanism, operably coupled to the first and second flanges, and configured for causing a position of the first and second flanges to move from an open position to a closed position; and
 a power switch, for selectively providing electrical energy to said electrically conductive material of said first flange such that an insect in contact therewith may be killed.

2. The apparatus of claim 1, wherein said electrical energy to said electrically conductive material comprises a high voltage alternating current (AC) power signal, and said apparatus further comprises:
a power converter, for converting direct current (DC) power signal provided by a battery into said high voltage alternating current (AC) power signal.

3. The apparatus of claim 2, further comprising a power switch configured to provide said DC power signal to said power converter in response to said flange operating mechanism causing said first and second flanges to move from an open position to a closed position.

4. The apparatus of claim 1, wherein:
said electrically conductive material comprises a plurality of conductive strands disposed in parallel across a frame of said first flange, wherein each conductive strand is maintained at a voltage level different from an adjacent conductive strand; and
said electrical energy to said electrically conductive material comprises a low voltage direct current (DC) signal applied to a first group of conductive strands, wherein each of said first group of conductive strands is separated from an adjacent conductive strand by a substantially zero potential conductive strand.

5. The apparatus of claim 4, further comprising a power switch configured to provide said DC power signal to said first group of conductive strands in response to said flange operating mechanism causing said first and second flanges to move from an open position to a closed position.

6. The apparatus of claim 1, wherein said flange operating mechanism is further configured for causing a position of said first and second flanges to move from said open position to said closed position.

7. The apparatus of claim 1, wherein said flange operating mechanism comprises a pair of handles operably coupled to said flanges via a pivot point to enable thereby a scissoring operation of said flanges via said mechanical operating mechanism.

8. The apparatus of claim 1, wherein said electrically conductive material comprises at least one of a conductive wire grid and a conductive mesh.

9. The apparatus of claim 1, further comprising an ultraviolet light source disposed within a housing associated with the backplate and configured to provide ultraviolet light between the first and second flanges.

10. The apparatus of claim 9, further comprising a light switch, for selectively providing electrical energy to said ultraviolet light source.

11. The apparatus of claim 1, wherein said second flange comprises at least one fan configured to generate an airflow directed to urge an insect toward the first flange.

12. The apparatus of claim 11, further comprising a fan switch, for selectively providing electrical energy to said at least one fan.

13. The apparatus of claim 12, wherein said power switch is further configured to prevent said DC power signal being provided to said power converter in response to said flange operating mechanism causing said first and second flanges to move from said closed position.

14. The apparatus of claim 12, wherein said power switch is further configured to prevent said DC power signal being provided to said first group of conductive strands in response to said flange operating mechanism causing said first and second flanges to move from said closed position.

* * * * *